United States Patent
Koseki

(10) Patent No.: US 12,072,610 B2
(45) Date of Patent: Aug. 27, 2024

(54) BUOYANCY ADJUSTING APPARATUS AND HOUSING

(71) Applicant: Kazuhiro Koseki, Miyagi (JP)

(72) Inventor: Kazuhiro Koseki, Miyagi (JP)

(73) Assignee: RICOH COMPANY, LTD., Tokyo (JP)

( * ) Notice: Subject to any disclaimer, the term of this patent is extended or adjusted under 35 U.S.C. 154(b) by 422 days.

(21) Appl. No.: 17/475,345

(22) Filed: Sep. 15, 2021

(65) Prior Publication Data

US 2022/0128887 A1 Apr. 28, 2022

(30) Foreign Application Priority Data

Oct. 28, 2020 (JP) ................................ 2020-180335

(51) Int. Cl.
*G03B 17/08* (2021.01)
*G05B 19/4155* (2006.01)
*G05D 5/00* (2006.01)

(52) U.S. Cl.
CPC ......... *G03B 17/08* (2013.01); *G05B 19/4155* (2013.01); *G05D 5/00* (2013.01); *G05B 2219/37399* (2013.01)

(58) Field of Classification Search
CPC ........ G03B 17/00; G03B 17/08; G05B 19/00; G05B 19/4155; G05B 2219/37399; G05D 5/00
USPC ........................................................ 114/331
See application file for complete search history.

(56) References Cited

U.S. PATENT DOCUMENTS

| 8,515,269 B2 * | 8/2013 | Londeree ............... G03B 17/08 396/25 |
| 10,313,592 B1 | 6/2019 | Burberry |
| 2020/0073393 A1 | 3/2020 | Berkenpas et al. |
| 2020/0086705 A1 | 3/2020 | Xiao et al. |

FOREIGN PATENT DOCUMENTS

| CN | 106005323 A | 10/2016 |
| CN | 108382550 A | 8/2018 |
| CN | 109795651 A | 5/2019 |
| CN | 111746767 A | 10/2020 |
| EP | 3 617 641 A1 | 3/2020 |
| JP | 5-158119 | 6/1993 |
| JP | 6-028848 | 4/1994 |
| JP | H11-237688 A | 8/1999 |
| JP | 2001-247086 A | 9/2001 |
| JP | 2007-328105 | 12/2007 |

(Continued)

OTHER PUBLICATIONS

Extended European Search Report issued Mar. 22, 2022 in European Patent Application No. 21203973.9, 8 pages.

(Continued)

*Primary Examiner* — Lars A Olson
(74) *Attorney, Agent, or Firm* — XSENSUS LLP

(57) ABSTRACT

A buoyancy adjusting apparatus includes: a volume-changeable portion configured to be coupled to a buoyancy-adjustment target; and an operation receiver configured to receive an operation from a user to change a volume of the volume-changeable portion. The volume of the volume-changeable portion is changeable according to the operation received by the operation receiver, to change the buoyancy of the buoyancy-adjustment target in fluid.

9 Claims, 5 Drawing Sheets

(56) References Cited

FOREIGN PATENT DOCUMENTS

| | | |
|---|---|---|
| JP | 2009-237498 A | 10/2009 |
| JP | 2010-221922 A | 10/2010 |
| JP | 2020-032996 A | 3/2020 |
| KR | 10-2012-0109956 A | 10/2012 |

OTHER PUBLICATIONS

Japanese Office Action issued Mar. 29, 2024 in corresponding Japanese Patent Application No. 2020-180335, 5 pages.

\* cited by examiner

FIG. 2
FIG. 3
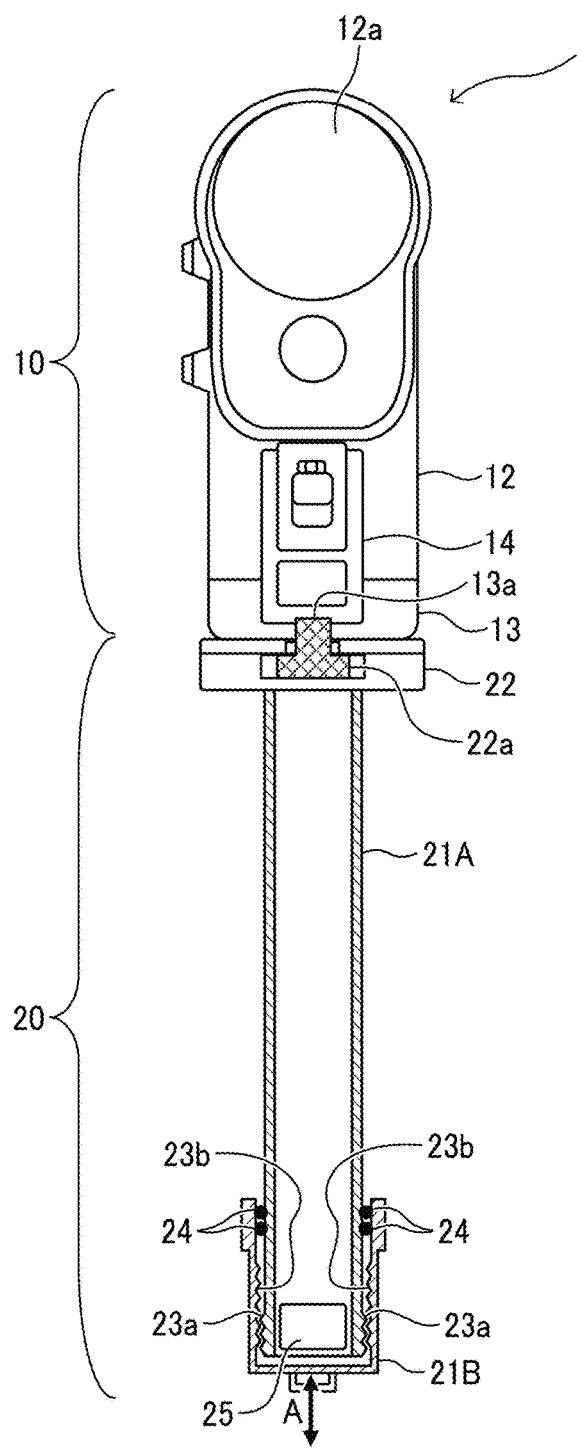
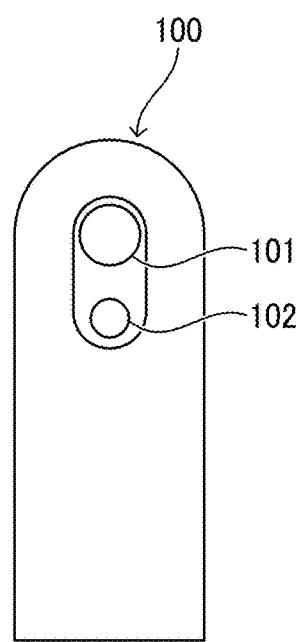

FIG. 4A
FIG. 4B
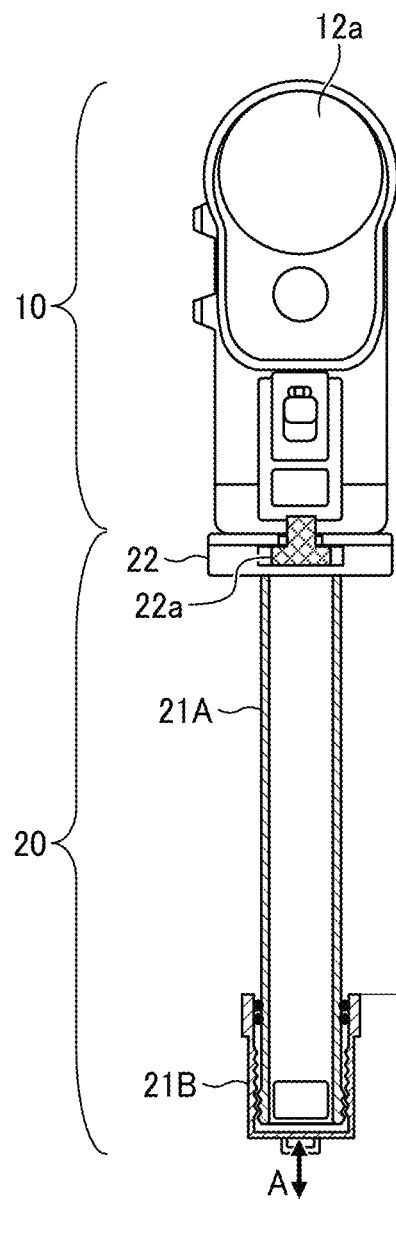
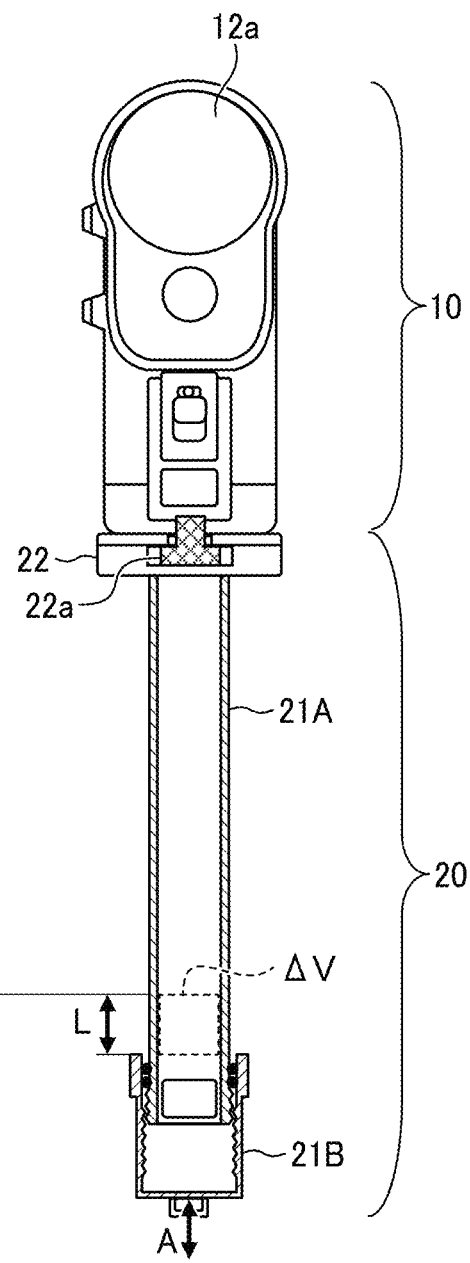

BUOYANCY ADJUSTING APPARATUS AND HOUSING

CROSS-REFERENCE TO RELATED APPLICATIONS

This patent application is based on and claims priority pursuant to 35 U.S.C. § 119(a) to Japanese Patent Application No. 2020-180335, filed on Oct. 28, 2020, in the Japan Patent Office, the entire disclosure of which is hereby incorporated by reference herein.

BACKGROUND

Technical Field

The present disclosure relates to a buoyancy adjusting apparatus and a housing.

Related Art

There are known buoyancy adjustors for adjusting buoyancy or buoyancy balance of an object to undergo buoyancy adjustment in fluid.

SUMMARY

In an aspect of this disclosure, there is provided a buoyancy adjusting apparatus includes: a volume-changeable portion configured to be coupled to a buoyancy-adjustment target; and an operation receiver configured to receive an operation from a user to change a volume of the volume-changeable portion. The volume of the volume-changeable portion is changeable according to the operation received by the operation receiver, to change the buoyancy of the buoyancy-adjustment target in fluid.

In another aspect of this disclosure, there is provided a housing including: a housing portion as the buoyancy-adjustment target containing an object; and a buoyancy adjuster configured to adjust buoyancy or buoyancy balance of the housing portion in fluid. The buoyancy adjuster is the buoyancy adjusting apparatus

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 2 is a partial cross-sectional view of the underwater housing according to an embodiment;

FIG. 3 is a front view of a camera contained in a housing portion of the underwater housing in FIG. 1A, according to an embodiment;

FIG. 4A is an illustration of the underwater housing including a volume-changeable portion having its volume reduced;

FIG. 4B is an illustration of the underwater housing including the volume-changeable portion having its volume increased;

Figure 1A:
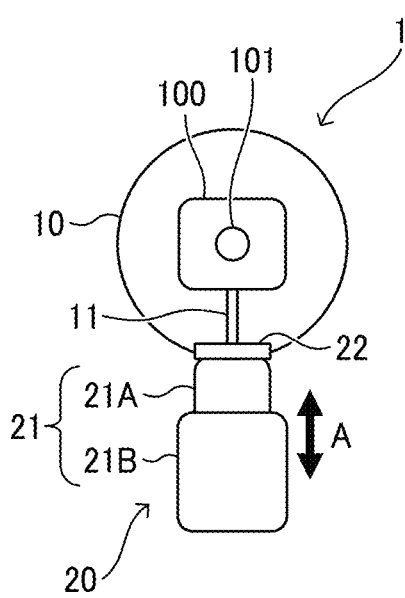
FIG. 1A is a front view of an underwater housing according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Further, as used herein, the term "connected/coupled" includes both direct connections and connections in which there are one or more intermediate connecting elements.

Some embodiments of the present disclosure improve the convenience for users to adjust buoyancy or buoyancy balance of a buoyancy-adjustment target.

Hereinafter, an embodiment is described in which a buoyancy adjuster according to at least one embodiment is applied to an underwater housing including a housing portion that accommodates a camera as an imaging device that is an object to be accommodated therein, and the camera in the underwater housing is used in water that is a fluid.

In the following description, the example of an object to be contained in the housing portion is a camera, and no limitation is intended thereby. In other words, the object to be contained in the housing portion may be any object, including an electronic device other than an image-capturing device, and an object other than the electronic device, as long as the object is not suitable for use in fluid without being contained in a housing. The fluid is not limited to water, and may be another liquid such as seawater or gas.

Figure 1B:
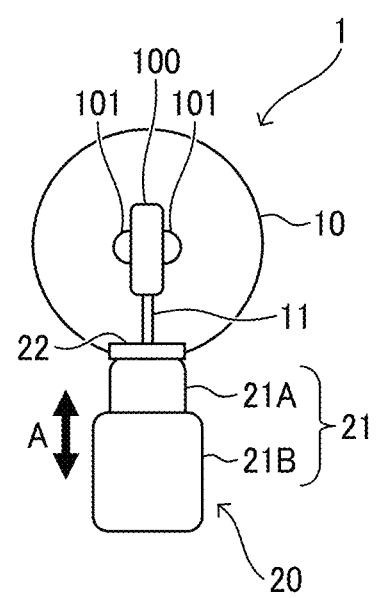
FIG. 1B is a side view of the underwater housing in FIG. 1A.

FIG. 1A is a front view of an underwater housing 1 according to an embodiment. FIG. 1B is a side view of the underwater housing 1 in FIG. 1A.

The underwater housing 1 according to an embodiment includes a housing portion 10 containing a camera 100, and a buoyancy adjuster 20 that adjusts buoyancy of the housing portion 10 containing the camera 100 in fluid.

The housing portion 10 is formed of a light transmissive member to allow the camera 100 inside the housing portion 10 to capture an image of the outside of the housing portion 10. For example, the housing portion 10 is made of transparent plastic. The housing portion 10 further contains a holder 11 for holding the camera 100. The holder 11 holding the camera 100 enables the camera 100 to be held inside the housing portion 10.

The buoyancy adjuster 20 serves as a buoyancy adjusting apparatus, to adjust buoyancy of an object, or a buoyancy-adjustment target (e.g., a housing portion 10 containing a camera 100) in fluid. The buoyancy adjuster 20 according to an embodiment includes a volume-changeable portion 21 that changes its volume to change the buoyancy according to the Archimedes principle. The volume-changeable portion 21 is a hermetically-sealed structure that includes a first structure portion 21A and a second structure portion 21B movable closer to (toward) and away from the first structure portion 21A along arrow A in FIGS. 1A and 1B. In this structure, the volume-changeable portion 21 changes its volume with the volume-changeable portion 21 hermetically sealed, by moving the second structure portion 21B closer to or away from the first structure portion 21A.

The buoyancy adjuster 20 includes a coupler 22 for coupling the volume-changeable portion 21 to the housing portion 10. The coupler 22 enables the volume-changeable portion 21 and the housing portion 10 to be detachably coupled to each other.

FIG. 2 is a partial cross-sectional view of the underwater housing 1 according to an embodiment, describing the specific configuration of the underwater housing 1. In FIG. 2, a cross section of the buoyancy adjuster 20, a part of the underwater housing 1, is illustrated.

FIG. 3 is a front view of the camera 100 contained in the housing portion 10 of the underwater housing 1 in FIG. 2, according to an embodiment.

As illustrated in FIG. 3, the camera 100 is a 360-degree camera provided with imagers 101 at the upper portions of the front and the back of the camera 100. Each imager 101 is substantially rectangular and includes a super wide-angle lens. The camera 100 further includes an operation key 102 at the central portion of the front surface of the camera 100. The operation key 102 receives an operation, including an operation to start shooting and an operation to end shooting, input by a user. The camera 100 captures an image (i.e., a 360-degree image) of the entire space from side to side and up and down (i.e., an omnidirectional area) by causing the two imagers 101 at the front and the back of the camera 100 to capture approximately hemispherical images.

As illustrated in FIG. 2, the housing portion 10 of the underwater housing 1 according to an embodiment has a length sufficient to accommodate the camera 100 having the configuration in FIG. 3. Specifically, the housing portion 10 includes a housing body 12 having an open bottom as an entrance, through which the camera 100 is put in or taken out of the housing portion 10. The housing portion 10 further includes a lid 13 for opening and closing the open bottom (i.e., the entrance) and a lock 14 for fastening the lid 13 in its closed position to maintain the housing portion 10 hermetically sealed. This prevents water from entering the housing portion 10, and also prevents the camera 100 from getting wet with water even if the housing portion 10 is put in water.

The camera 100, placed through the entrance (i.e., opening) at the bottom of the housing body 12, comes into contact with the inner wall of the housing portion 10 to be secured in its regular position upon fastening the lid 13 in its closed position by the lock 14.

The lid 13 of the housing portion 10 is provided with a screw hole 13a into which a coupling screw 22a in the coupler 22 of the buoyancy adjuster 20 is screwed. Screwing the coupling screw 22a of the coupler 22 into the screw hole 13a enables the buoyancy adjuster 20 to be coupled to the lower end of the housing portion 10 as illustrated in FIG. 2. Preferably, the housing portion 10 includes an attaching part, for example, on the lid 13, for attaching a strap to the housing portion 10 to prevent the underwater housing 1 from being separated from the user.

Further, at least a portion of the housing portion 10, corresponding to an image-capturing region of the camera 100, is formed of a transparent plastic to allow the camera 100 inside the housing portion 10 to capture an image of the outside of the housing portion 10. In the housing portion 10 according to an embodiment, the housing body 12 and the lid 13 are transparent. The housing body 12 has substantially spherical portions 12a covering the two imagers 101 to prevent adverse effects, such as image distortion, on images captured by the imagers 101 of the camera 100.

The camera 100 contained in the housing portion 10 according to an embodiment sinks in water by itself, but the housing portion 10 as a whole (i.e., the buoyancy-adjustment target) containing the camera 100 (i.e., the camera 100 is contained in the housing portion 10) floats in water. Carrying or operating such a housing portion 10 in water, which usually floats in water is troublesome for users. To deal with such an issue, the housing portion 10 is coupled to the buoyancy adjuster 20 to obtain a neutral buoyancy that acts to balance the buoyancy of the entirety of the buoyancy adjuster 20 and the housing portion 10 containing the camera 100 with the gravity thereof.

Such a neutral buoyancy may be obtained only for the housing portion 10 containing the camera 100, without the buoyancy adjuster 20, by adjusting weight or volume of the housing portion 10. However, the housing portion 10 alone is difficult to reduce its buoyancy because in the housing portion 10 according to an embodiment, the camera 100 is relatively lightweight, and the housing body 12 as a whole has a shape that partially protrudes to have substantially-spherical portions 12a covering the two imagers 101. For this reason, the buoyancy adjuster 20 is additionally used to obtain the neutral buoyancy.

As described above, the buoyancy adjuster 20 according to an embodiment includes the volume-changeable portion 21 including the first structure portion 21A and the second structure portion 21B, to change the buoyancy by changing the volume. The first structure portion 21A is, for example, a large hollow cylindrical member. The first structure portion 21A as such a long member enables the camera 100 to capture an image at a position away from the user. Notably, the first structure portion 21A is not limited to such a hollow cylindrical member, and may be a solid member or a member having a non-circular (e.g., rectangular) cross section.

The second structure portion 21B is also a long hollow cylindrical member. The second structure portion 21B is also not limited to such a hollow cylindrical member, and may be a solid member or a member having a non-circular (e.g., rectangular) cross section. Screw threads 23a are formed on an outer circumferential surface of a lower-end portion of the first structure portion 21A, and screw grooves 23b that engage with the screw threads 23a are formed on an inner circumferential surface of an upper-end portion of the second structure portion 21B. The screw threads 23a and the screw grooves 23b constitute a screw structure. In this configuration, rotating the second structure portion 21B by the user to tighten or loosen the engagement of the screw threads 23a with the screw grooves 23b allows the second structure portion 21B to move closer to or away from the first structure portion 21A along the arrow A in FIG. 2.

Such an action thus changes the total volume of the volume-changeable portion 21 including the first structure portion 21A and the second structure portion 21B. FIG. 4A is an illustration of the screw structure in which the screw threads 23a are firmly engaged with the screw grooves 23b. FIG. 4B is an illustration of the screw structure in which the screw threads 23a is less firmly engaged with the screw grooves 23b. With a change in the state of the screw structure from FIG. 4A to FIG. 4B, the volume-changeable portion 21 extends its length by the length L and increases in volume by the amount ΔV enclosed by broken lines. Reversely, with a change in the state of the screw structure from FIG. 4B to FIG. 4A, the volume-changeable portion 21 shortens by the length L and also decreases in volume by the amount ΔV enclosed by broken lines. In one or more embodiments, the first structure portion 21A and the second structure portion 21B, which has the screw structure of the screw threads 23 and the screw grooves 23b, serve as an operation receiver that receives an operation of a user to change the volume of the volume-changeable portion 21.

In this case, the screw structure of the screw threads 23a and the screw grooves 23b constitutes the operation receivers that receives an operation of a user to change the volume of the volume-changeable portion 21. However, no limitation is intended thereby. For example, the operation receiver may be a piston structure in which the second structure portion 21B slides closer to or away from the first structure portion 21A along the arrow A in FIGS. 4A and 4B.

The operation receiver according to an embodiment receives an operating force given by a user, which causes the volume-changeable portion 21 to change its volume. In some embodiments, an actuator (i.e., a driver), including a motor and a solenoid, is used to drive the volume-changeable portion 21 to change its volume. In this case, a controller that controls the actuator turns on and off the actuator or determines an operation amount or an operation direction according to an operation from the user operating the operation receiver, such as an operation key or an operation lever. This configuration allows a user to operate the volume-changeable portion 21 to change the volume with less labor for operation according to the user's desire.

Further, a seal member 24 is disposed between the first structure portion 21A and the second structure portion 21B to keep the volume-changeable portion 21 hermetically sealed while the second structure portion 21B moves closer to or away from the first structure portion 21A. The seal member 24 is, for example, an O-ring made of resin.

The second structure portion 21B according to an embodiment is provided with a weight 25. As described above, the housing portion 10 containing the camera 100 as a whole floats in water, and the buoyancy adjuster 20, which is a hollow and hermetically-sealed structure, is lightweight. For this reason, the weight 25 is provided to gain the neutral buoyancy of the entirety of the buoyancy adjuster 20 and the housing portion 10 containing the camera 100.

In one or more embodiments, the buoyancy F0 applied to the housing portion 10 is determined by the weight of the housing portion 10, the volume of the housing portion 10, and the weight of the camera 100 contained in the housing portion 10. In contrast, the buoyancy F1 applied to the buoyancy adjuster 20 is determined by the weight M of the buoyancy adjuster 20, the volume of the buoyancy adjuster 20 (i.e., the volume of the volume-changeable portion 21), and the weight Mc of the weight 25 within the buoyancy adjuster 20. As described above, changing the length of the volume-changeable portion 21 by the length L to change the volume of the volume-changeable portion 21 by the amount ΔV changes the buoyancy F1 applied to the buoyancy adjuster 20 by an amount ΔF for the amount ΔV (i.e., the volumetric change amount).

To gain the neutral buoyancy of the underwater housing 1, the second structure portion 21B is moved closer to or away from the first structure portion 21A to adjust the volumetric change amount ΔV of the volume-changeable portion 21, so as to obtain the amount ΔF that satisfies F0+(F1+ΔF)=M+Mc. To float the underwater housing 1, the second structure portion 21B is moved closer to or away from the first structure portion 21A to adjust the volumetric change amount ΔV of the volume-changeable portion 21, so as to obtain the amount ΔF that satisfies F0+(F1+ΔF)>M+Mc. To sink the underwater housing 1, the second structure portion 21B is moved closer to or away from the first structure portion 21A to adjust the volumetric change amount ΔV of the volume-changeable portion 21, so as to obtain the amount ΔF that satisfies F0+(F1+ΔF)<M+Mc.

In some embodiments, the weight 25 may not be disposed in the second structure portion 21B of the buoyancy adjuster 20, and may be disposed in the first structure portion 21A or in the housing portion 10. The arrangement of the weight 25 is appropriately determined according to various purposes. For example, the center of gravity of the entirety of the underwater housing 1 containing the camera 100 may be positioned to facilitate handling of the underwater housing 1.

In one or more embodiments, the weight 25 is disposed in the second structure portion 21B at an end of the buoyancy adjuster 20, opposite the other end adjacent to the housing portion 10 containing the camera 100. This arrangement allows the center of gravity of the entirety of the underwater housing 1 containing the camera 100 to be positioned near the center of the underwater housing 1 (i.e., near the intermediate position of the first structure portion 21A), thus facilitating handling of the underwater housing 1 on the ground, for example.

The configuration according to an embodiment in which the weight 25 is disposed in the second structure portion 21B that is movable closer to and away from the first structure portion 21A causes more movement of the center of gravity of the underwater housing 1 during a change in the volume of the volume-changeable portion 21 by moving the second structure portion 21B closer to or away from the first structure portion 21A. This enables adjustment of the center of gravity of the entirety of the underwater housing 1 by moving the second structure portion 21B closer to or away from the first structure portion 21A. Such an adjustment enables a balance between the positions at which buoyancy and gravity act on the underwater housing 1, respectively, and thus facilitates handling of the underwater housing 1.

For example, a user, who desires to capture a 360-degree image using the camera 100 in water (e.g., in the sea), goes underwater carrying the underwater housing 1 with the camera 100 contained in the housing portion 10. At this time, the underwater housing 1 provided with the housing portion 10 and without the buoyancy adjuster 20 has a too large buoyancy, causes difficult handling while submerging and capturing an image, and further restricts the movement of the user carrying such an underwater housing 1 in water.

The underwater housing 1 according to an embodiment, in which the housing portion 10 is coupled to the buoyancy adjuster 20, provides neutral buoyancy of the underwater housing 1 as a whole. Using such a neutral buoyancy enables the underwater housing 1 to be kept floating near the hand of the user without suddenly separating therefrom when the user releases the underwater housing 1. This eliminates a need for the user to continue holding the underwater housing 1 in water and also a need for using, for example, a strap to be coupled to the underwater housing 1 to allow the user to carry the underwater housing 1. Thus, the underwater housing 1 is easily handled by the user, and the movement of the user holding the underwater housing 1 in water is not restricted.

Further, in one or more embodiments, rotating the second structure portion 21B by the user to move the second structure portion 21B closer to or away from the first structure portion 21A enables a change in the volume of the volume-changeable portion 21 to thus change the buoyancy of the housing portion 10 containing the camera 100. In this configuration, the buoyancy of the housing portion 10 containing the camera 100 is adjusted according to an operation by the user. This configuration allows the user to adjust the buoyancy as desired.

In one or more embodiments, rotating the second structure portion 21B by the user to increase the volume of the volume-changeable portion 21 of the underwater housing 1 having the neutral buoyancy increases the buoyancy of the underwater housing 1 and cause the underwater housing 1 to float in water. Thus, the underwater housing 1 alone is caused to float upward (rise) in water and capture an underwater image (i.e., an image of an underwater area above and away from the user after being released from the user's hand.

In contrast, rotating the second structure portion 21B by the user to reduce the volume of the volume-changeable portion 21 having the neutral buoyancy reduces the buoyancy of the underwater housing 1 and causes the underwater housing 1 to sink. Thus, the underwater housing 1 alone goes down below the surface of water and captures an underwater image (i.e., an image of an underwater area below and away from the user) after being released from the user's hand.

In one or more embodiments, the underwater housing 1 alone is caused to rise or sink (go to a lower level) according to an operation by the user, as described above. This configuration prevents an undesired object (e.g., the user's finger pressing the operation key, the user's face, or body) from being reflected in a 360-degree image captured by the camera 100. Although such reflection of an undesired object may be avoided by using a long selfie stick and a self-timer, carrying and move the long selfie stick in water imposes a heavy burden on the user, reducing the convenience. In contrast, the configuration according to one or more embodiments that causes the underwater housing 1 alone to rise or go downward eliminates a need for such an inconvenient long selfie stick that requires the user to move or carry it, increasing the convenience.

As described above, the configuration according to one or more embodiments that allows the user to rotate the second structure portion 21B in water to cause the underwater housing 1 to float or sink, and thus achieves more latitude in handling the underwater housing 1 and higher user convenience.

Further, as described above, in some other embodiments, an actuator (a driver) such as a motor or a solenoid is used to drive the volume-changeable portion 21 to change its volume. This configuration increases the latitude in handling the underwater housing 1 and the user convenience more.

Figure 5:
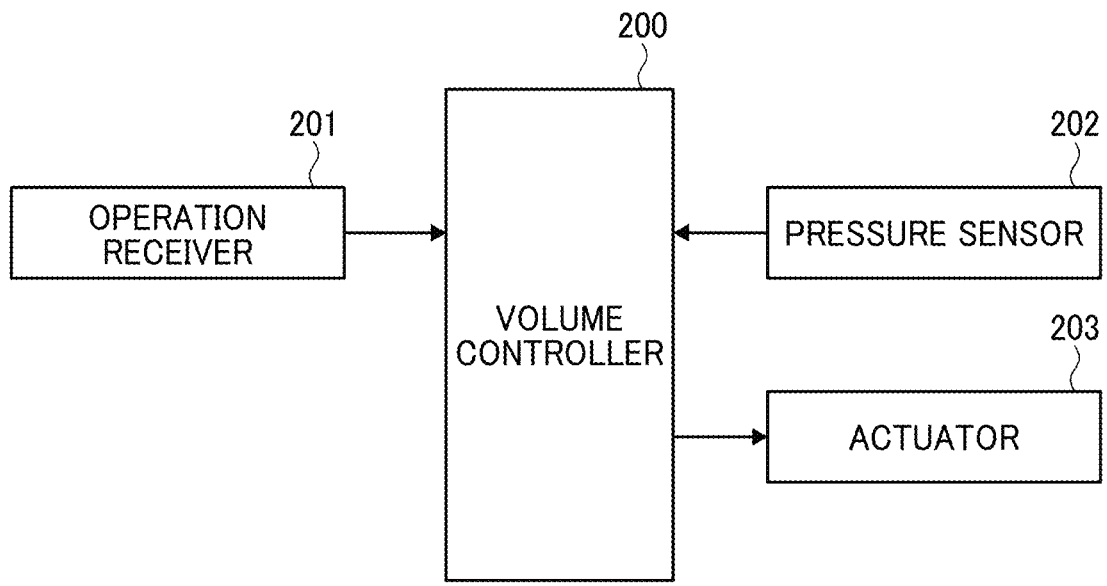
FIG. 5 is a block diagram of a configuration of the underwater housing including a pressure sensor, to change the volume of the volume-changeable portion according to a water pressure detected by the pressure sensor.

FIG. 5 is a block diagram of an example configuration of the underwater housing 1 including a pressure sensor 202, to change the volume of the volume-changeable portion 21 according to a water pressure detected by the pressure sensor 202. As illustrated in FIG. 5, the pressure sensor 202, or a sensor, is disposed in the underwater housing 1 and detects a water pressure (i.e., fluid pressure) applied according to the water depth at which the underwater housing 1 is located. In FIG. 5, the underwater housing 1 further includes a volume controller 200, an operation receiver 201, and an actuator 203. The volume controller 200 controls the actuator 203 to change the volume of the volume-changeable portion 21 according to a water pressure detected by the pressure sensor 202. The operation receiver 201 receives an operation from a user.

This configuration allows the operation receiver 201 to receive an instruction, for example, to designate the water depth from the user operating the operation receiver 201, and enables the underwater housing 1 to move to the designated water depth under automatic control. Specifically, the volume controller 200 controls the actuator 203 to change the volume of the volume-changeable portion 21 in accordance with, for example, a comparison result between the water pressure detected by the pressure sensor 202 and the water pressure corresponding to the water depth designated by the user. Thus, the underwater housing 1 is automatically caused to go upward or downward to the water depth designated by the user operating the operation receiver 201.

Figure 6:
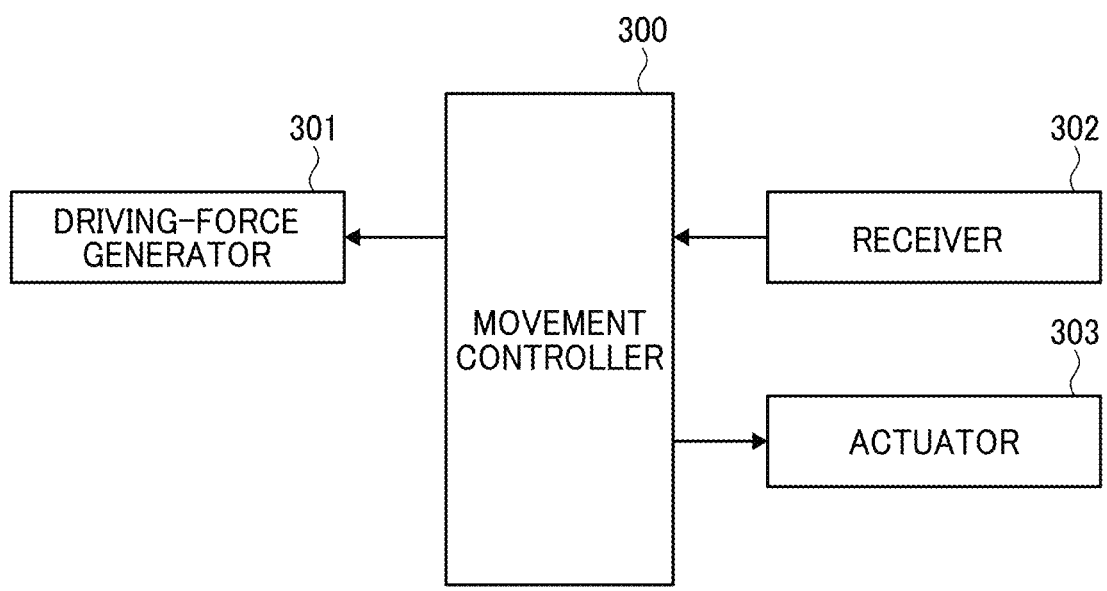
FIG. 6 is a block diagram of a control configuration that controls a driving-force generator in accordance with control information received by a receiver, to control a movement of the underwater housing in water, according to an embodiment.

FIG. 6 is a block diagram of a control configuration that controls a driving-force generator 301 in accordance with control information received by a receiver 302, to control a movement of the underwater housing 1 in water, according to an embodiment. In FIG. 6, the underwater housing 1 includes the driving-force generator 301 that generates driving force in water, a movement controller 300, a receiver 302, and an actuator 303. The driving-force generator 301 is not particularly limited, and includes, for example, a propeller, a drive source (e.g., a motor) that rotates the propeller, and a drive circuit that drives the drive source. The movement controller 300 controls the driving-force generator 301 to control the movement of the underwater housing 1 in water. This configuration enables the underwater housing 1 to be easily moved to the desired position, and facilitates handling of the underwater housing 1 more, thus increasing the convenience more.

In some embodiments, the movement controller 300 controls the movement of the underwater housing 1 in water according to an operation from the user, received by the operation receiver in the underwater housing 1. In FIG. 6, the movement controller 300 controls the movement of the underwater housing 1 in the water in accordance with the control information from an external communication device, received by the receiver 302. The receiver 302 receives information through wired communication or wireless communication (e.g., communication using radio waves or ultrasonic waves). In this case, the movement controller 300 controls the movement of the underwater housing 1 in water according to a remote operation received by the receiver 302, from the user operating the external communication device.

In FIG. 6, the movement controller 300 may control the actuator 303 to change the volume of the volume-changeable portion 21 in accordance with the control information received by the receiver 302, from the external communication device. In this case, the movement controller 300 regulates the volume of the volume-changeable portion 21 according to a remote operation from a user operating the external communication device, to control the movement (i.e., going upward or downward in water) of the underwater housing 1 in water. In this case, the receiver 302 serves as the operation receiver.

To stabilize the orientation of the underwater housing 1 is a serious challenge in capturing an underwater image by using the camera 100 contained in the underwater housing 1 released from the user's hand in water. As described above, the underwater housing 1 according to an embodiment is configured such that the housing portion 10 floats in water, whereas the buoyancy adjuster 20 sinks in water because of the weight 25 in the buoyancy adjuster 20. This configuration stabilizes the orientation of the underwater housing 1 released from the user's hand, with the housing portion 10 at the upper portion and the buoyancy adjuster 20 at the lower portion of the underwater housing 1. In other words, the orientation of the underwater housing 1 is stabilized when the underwater housing 1 faces in the vertical direction.

In some cases, however, the underwater housing 1 may rotate around the central axis in the longer-side direction of the underwater housing 1 (i.e., the central axis in the longer-side direction of the buoyancy adjuster 20 as a long member) in flowing water (i.e., undulating water), causing an unstable rotational orientation of the underwater housing 1. With such unstable rotational orientation, the camera 100 has difficulties capturing images as desired.

Figure 7:
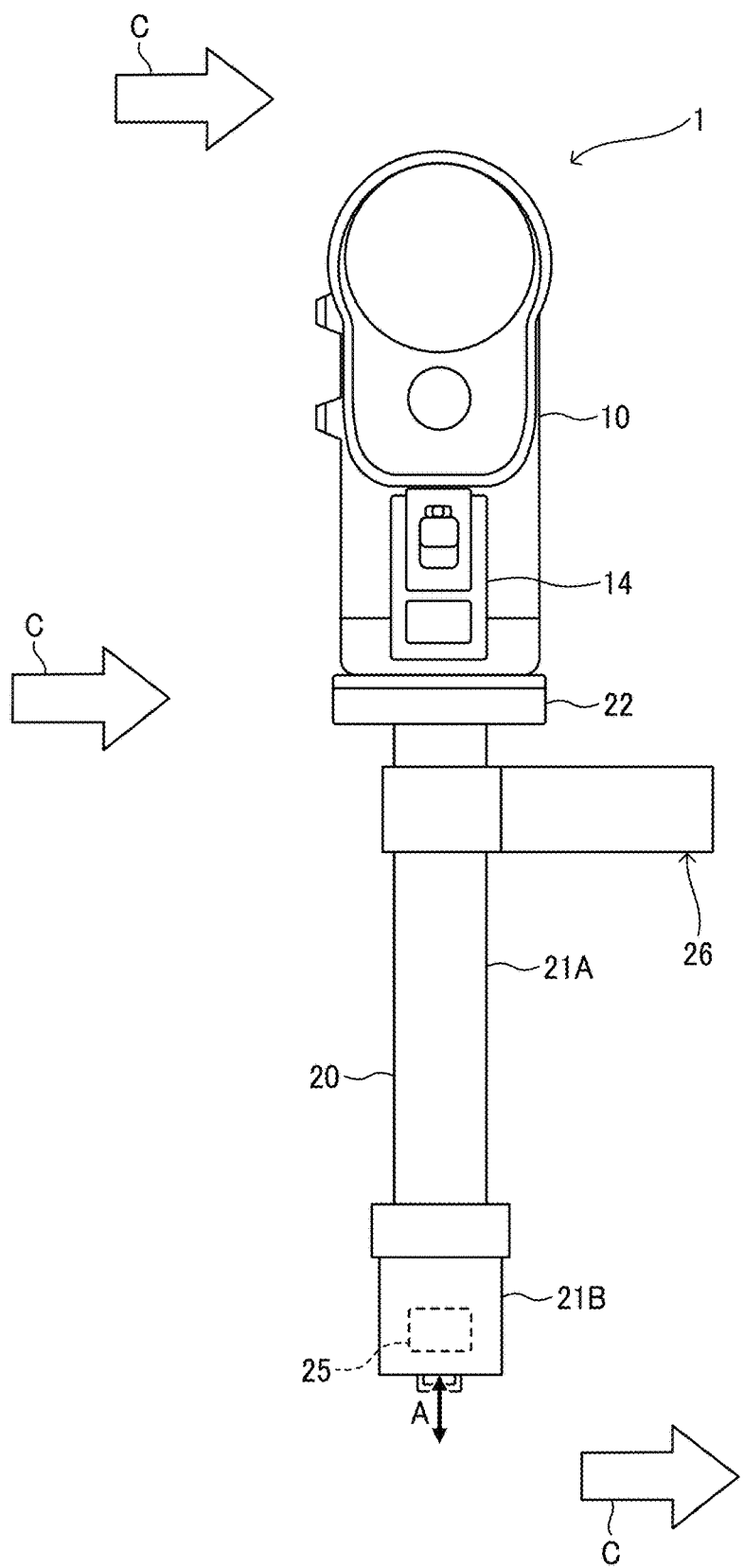
FIG. 7 is a front view of an underwater housing provided with a wing part according to a variation of an embodiment.

To prevent rotation of the underwater housing 1 in flowing water (undulating water) to stabilize the orientation of the underwater housing 1, the underwater housing 1 is provided with an orientation-stabilizable member, such as a blade 26, as illustrated in FIG. 7. The blade 26 is a plate-shaped member protruding beyond the first structure portion 21A of the buoyancy adjuster 20 in the lateral direction (i.e., a direction orthogonal to the longer-side direction of the first structure portion 21A of the buoyancy adjuster 20) and having its surfaces substantially parallel to the lateral direction of the first structure portion 21A of the buoyancy adjuster 20. The blade 26 enables the underwater housing 1 likely to have a stable orientation where the surfaces of the blade 26 are parallel to a flow direction C, and enables the underwater housing 1 to face in a stable direction without rotating even in the flowing water, or the undulating water.

The blade 26 is preferably attachable to and detachable from the first structure portion 21A of the buoyancy adjuster 20. Alternatively, the blade 26 may be integrated with the first structure portion 21A as a single integrated unit. In some examples, the blade 26 is attached to the second structure portion 21B or the housing portion 10, instead of the first structure portion 21A of the buoyancy adjuster 20. Further, the orientation-stabilizable member is not limited to the blade and may be any member that enable the orientation of the underwater housing 1 to be stable (i.e., enables the housing portion 10 to face in a stable direction).

Notably, in flowing water (i.e., undulating water), the housing portion 10 may swing (pivot) about the position near the center of gravity of the underwater housing 1 (e.g., near the weight 25), possibly causing an unstable orientation of the underwater housing 1. The blade as the orientation-stabilizable member is attached to the underwater housing 1 to deal with such an issue as well. In this case, the blade is disposed to have its surfaces substantially parallel to the horizontal direction (i.e., the lateral direction) of the underwater housing 1.

In the above-described embodiments, the buoyancy-adjustment target is assumed to float in water. The embodiments of the present invention are applicable to the buoyancy-adjustment target that is assumed to sink in water.

Further, in the above-described embodiments, the housing portion 10 is separate from the buoyancy adjuster 20. Alternatively, the housing portion 10 is integrated with the buoyancy adjuster 20 as a single integrated unit.

The configurations described above are examples, and aspects of the present disclosure provide respective effects as follows.

First Aspect

According to a first aspect, a buoyancy adjusting apparatus (e.g., a buoyancy adjuster 20) to adjust buoyancy or buoyancy balance of a buoyancy-adjustment target (e.g., a housing portion 10 containing a camera 100) in fluid (e.g., water), includes: a volume-changeable portion (21) configured to be coupled to the buoyancy-adjustment target; and an operation receiver (e.g., a first structure portion 21A and a second structure portion 21B) configured to receive an operation from a user to change a volume of the volume-changeable portion. The volume of the volume-changeable portion (21) is changeable according to the operation received by the operation receiver, to change the buoyancy of the buoyancy-adjustment target in fluid.

This aspect enables a change in volume of the volume-changeable portion to adjust the buoyancy or the buoyancy balance of the buoyancy-adjustment target, according to an operation from the user. This allows the user to adjust the buoyancy of the buoyancy-adjustment target by his/her own operation, to cause the buoyancy-adjustment target to rise, sink, or stay at a predetermined water depth in water. Further, the first aspect also allows the user to adjust the buoyancy of the buoyancy-adjustment target by his/her own operation, to increase or reduce the rising speed of the buoyancy-adjustment target floating upward in water, or the sinking speed of the buoyancy-adjustment target. Further, the first aspect also allows the user to adjust the buoyancy balance of the buoyancy-adjustment target by his/her own operation, to change the orientation of the buoyancy-adjustment target in fluid. The first aspect, which enables adjustment of the buoyancy or the buoyancy balance of the buoyancy-adjustment target according to an operation from the user, facilitates the user's handling of the buoyancy-adjustment target in fluid and increases the user's convenience for buoyancy adjustment (adjustment of the buoyancy or the buoyancy balance) of the buoyancy-adjustment target.

Second Aspect

In the second aspect according to the first aspect, the buoyancy adjusting apparatus (20) further includes a coupler (22) configured to detachably couple the volume-changeable portion (21) to the buoyancy-adjustment target (10).

This aspect allows a user to remove and detach the volume-changeable portion from the buoyancy-adjustment target, thus improving the convenience of the underwater housing 1.

Third Aspect

In the third aspect according to the first aspect or the second aspect, the volume-changeable portion (21) is a hermetically-sealed structure, and the volume of the hermetically-sealed structure is changeable with the hermetically-sealed structure hermetically sealed.

This aspect enables a hollow volume-changeable portion to be adopted, thus achieving a more lightweight volume-changeable portion.

Fourth Aspect

In the fourth aspect according to the third aspect, the hermetically-sealed structure includes a first structure portion (21A) and a second structure portion (21B) movable toward or away from the first structure portion (21A). The volume of the volume-changeable portion (21) is changeable with a movement of the second structure portion (21B) toward or away from the first structure portion (21A).

This aspect enables the volume-changeable portion to simply change its volume.

Fifth Aspect

In the fifth aspect according to any one of the first aspect to the fourth aspect, the buoyancy-adjustment target (10) floats in fluid. The volume-changeable portion (21) further includes a weight 25 that sinks in fluid.

This aspect improves the user's convenience for buoyancy adjustment of the buoyancy-adjustment target floating in fluid. Further, appropriately adjusting the flow rate and the arrangement of the weight enables the neutral buoyancy to act on the buoyancy-adjustment target, and facilitates the handling of the buoyancy-adjustment target in fluid.

Sixth Aspect

In the sixth aspect according to any one of the first aspect to the fifth aspect, the buoyancy adjusting apparatus (20) further includes: a driving-force generator (301) configured to generate driving force in fluid; a receiver (302) configured to receive control information from an external communication device; and a movement controller (300) configured to control the driving-force generator (301) to generate driving force to move the buoyancy-adjustment target according to the control information received by the receiver (302).

This aspect enables the buoyancy-adjustment target to move to a desired position in fluid according to a remote operation from the user operating the external communication device, thus improving the handling and the convenience.

Seventh Aspect

In the seventh aspect according to any one of the first aspect to the sixth aspect, the buoyancy adjusting apparatus (20) further includes: a sensor (a pressure sensor 202) configured to detect a fluid pressure; and a volume controller (200) configured to control the volume-changeable portion (21) to change the volume, according to the fluid pressure detected by the sensor (202).

This aspect enables the buoyancy-adjustment target to automatically rise or sink to the water depth designated by the user in fluid, thus improving the handling and the convenience.

Eighth Aspect

In the eighth aspect according to any one of the first aspect to the seventh aspect, the buoyancy adjusting apparatus (20) further includes an orientation-stabilizable member (e.g., a blade 26) configured to stabilize an orientation of the buoyancy-adjustment target in fluid.

This aspect reduces a change in the orientation of the buoyancy-adjustment target according to the flow of the fluid.

Ninth Aspect

In the ninth aspect, a housing (1) includes: a housing portion (10) as the buoyancy-adjustment target (10) containing an object (e.g., a camera 100); and a buoyancy adjuster (20) configured to adjust buoyancy or buoyancy balance of the housing portion (10) in fluid. The buoyancy adjuster (20) is the buoyancy adjusting apparatus according to any one of the first aspect to the eighth aspect.

This aspect enables adjustment of the buoyancy of the housing portion containing an object according to an operation from the user and facilitates the user's handling of the housing portion in fluid, thus improving the use's convenience for buoyancy adjustment of the housing portion.

Tenth Aspect

In the tenth aspect according to the ninth aspect, the object contained in the housing portion (10) is an image-capturing device (e.g., the camera 100).

This aspect improves the handling and convenience of the underwater housing 1 during capturing of images in fluid by using the image-capturing device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A buoyancy adjusting apparatus comprising:
a volume-changeable portion configured to be coupled to a buoyancy-adjustment target, the volume-changeable portion being a hermetically-sealed structure including:
  a first structure portion; and
  a second structure portion movable toward or away from the first structure portion;
an operation receiver configured to receive an operation from a user to change a volume of the volume-changeable portion; and
an orientation-stabilizable member to stabilize an orientation of the buoyancy-adjustment target in fluid,
wherein
  the volume of the volume-changeable portion is changeable according to the operation received by the operation receiver, to change the buoyancy of the buoyancy-adjustment target in fluid,
  the orientation stabilizable member includes a plate protruding beyond the first structure portion in a lateral direction of the first structure portion, and
  the plate has a surface parallel to the lateral direction of the first structure portion.

2. The buoyancy adjusting apparatus according to claim 1, further comprising a coupler configured to detachably couple the volume-changeable portion to the buoyancy-adjustment target.

3. The buoyancy adjusting apparatus according to claim 1, wherein a volume of the hermetically-sealed structure is changeable with the hermetically-sealed structure being hermetically sealed.

4. The buoyancy adjusting apparatus according to claim 3, wherein the volume of the volume-changeable portion is changeable with a movement of the second structure portion toward or away from the first structure portion.

5. The buoyancy adjusting apparatus according to claim 1, wherein the buoyancy-adjustment target floats in fluid, and
wherein the volume-changeable portion further includes a weight that sinks in fluid.

6. The buoyancy adjusting apparatus according to claim 1, further comprising:
   a driving-force generator configured to generate driving force in fluid; and
   circuitry configured to:
      receive control information from an external communication device; and
      control the driving-force generator to generate driving force to move a housing including the buoyancy-adjustment target coupled to the volume-changeable portion, according to the received control information.

7. The buoyancy adjusting apparatus according to claim 1, further comprising:
   a sensor configured to detect a fluid pressure; and
   circuitry configured to control the volume-changeable portion to change the volume according to the fluid pressure detected by the sensor.

8. A housing comprising:
   a housing portion as the buoyancy-adjustment target containing an object; and
   a buoyancy adjuster configured to adjust buoyancy or buoyancy balance of the housing portion in fluid,
   wherein the buoyancy adjuster is the buoyancy adjusting apparatus according to claim 1.

9. The housing according to claim 8, wherein the object is an image-capturing device.

* * * * *